US012524691B2

(12) United States Patent
Haverkamp et al.

(10) Patent No.: US 12,524,691 B2
(45) Date of Patent: Jan. 13, 2026

(54) CENTRAL CONTROLLER FOR A QUANTUM SYSTEM

(71) Applicant: INTERNATIONAL BUSINESS MACHINES CORPORATION, Armonk, NY (US)

(72) Inventors: Frank Haverkamp, Tuebingen (DE); Juergen Saalmueller, Holzgerlingen (DE); Markus Buehler, Schoenbuch (DE); Tristan Müller, Tübingen (DE); Thilo Maurer, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 819 days.

(21) Appl. No.: 17/730,150

(22) Filed: Apr. 26, 2022

(65) Prior Publication Data

US 2023/0342647 A1 Oct. 26, 2023

(51) Int. Cl.
*G06N 10/20* (2022.01)
*G06N 10/40* (2022.01)

(52) U.S. Cl.
CPC .............. *G06N 10/20* (2022.01); *G06N 10/40* (2022.01)

(58) Field of Classification Search
CPC ........ G06N 10/10; G06N 10/20; G06N 10/40; G06N 10/60; G06N 10/70; G06N 10/80;
(Continued)

(56) References Cited

U.S. PATENT DOCUMENTS 8,250,133 B2    8/2012   Blumrich et al.
10,275,288 B2   4/2019   Pinto et al.
(Continued)

FOREIGN PATENT DOCUMENTS

CA    3112785 A1 *   3/2020  ............. G06N 10/40
CA    3174231 A1 *   10/2021  .......... G06F 11/1004
(Continued)

OTHER PUBLICATIONS

List of IBM Patents or Patent Applications Treated as Related, 2 Pgs.
(Continued)

*Primary Examiner* — Steven P Sax
(74) *Attorney, Agent, or Firm* — Amin, Turocy & Watson, LLP (57) ABSTRACT

A quantum computing system having a central controller with improved latency executes a first instruction at a processing unit of the central controller. The central controller interconnects a plurality of control entities for configuring and measuring a plurality of qubits. A set of selected channels carry measurement results for a first quantum computation by the plurality of qubits. When the first instruction is a multi-channel-receive instruction, the system stalls the processing unit from executing any further instructions until each channel of the set of two or more selected channels has provided an input from a remote peer. Different channels in the set of selected channels are examined simultaneously. The system resumes execution at the processing unit of a second instruction after the stalling.

11 Claims, 6 Drawing Sheets

(58) Field of Classification Search
CPC ...... G06N 10/00; H03K 19/195; G06F 40/30; G06F 1/105; G06F 15/16; G01R 31/31703; H10N 60/12

See application file for complete search history.

(56) References Cited

U.S. PATENT DOCUMENTS

| | | | |
|---|---|---|---|
| 11,616,498 B2* | 3/2023 | Cohen | G06N 10/40 327/291 |
| 11,888,978 B1* | 1/2024 | Wang | G06F 1/105 |
| 12,111,352 B2* | 10/2024 | Ziv | G06N 10/20 |
| 12,182,661 B2 | 12/2024 | Rigetti et al. | |
| 12,242,406 B2* | 3/2025 | Sivan | G06N 10/40 |
| 12,314,815 B2* | 5/2025 | Szmuk | G06N 10/40 |
| 2018/0260245 A1* | 9/2018 | Smith | G06F 15/163 |
| 2021/0173660 A1 | 6/2021 | Hogaboam et al. | |
| 2021/0182071 A1 | 6/2021 | Khammassi | |
| 2021/0248506 A1* | 8/2021 | Hoskinson | H10N 60/12 |
| 2021/0279625 A1* | 9/2021 | Shani | G06F 15/16 |
| 2021/0374583 A1 | 12/2021 | Griffin | |
| 2022/0150044 A1* | 5/2022 | Xiang | G06N 10/70 |
| 2022/0172096 A1* | 6/2022 | Rudolph | B82Y 20/00 |
| 2022/0345304 A1* | 10/2022 | Taylor | G06F 40/30 |
| 2023/0040849 A1* | 2/2023 | Shanmugam Sakthivadivel | G06N 10/80 |
| 2023/0099621 A1* | 3/2023 | Shi | G06N 3/006 |
| 2023/0153155 A1* | 5/2023 | Krneta | G06N 10/80 718/104 |
| 2023/0236244 A1* | 7/2023 | Zvi | G01R 31/31703 702/109 |
| 2023/0315539 A1 | 10/2023 | Scheps et al. | |
| 2023/0342652 A1 | 10/2023 | Haverkamp et al. | |
| 2023/0419157 A1* | 12/2023 | Wan | G06N 10/70 |

FOREIGN PATENT DOCUMENTS

| | | | | |
|---|---|---|---|---|
| CA | 3206748 A1 | * | 11/2022 | H04B 10/70 |
| CN | 109217939 B | * | 12/2020 | H04B 10/70 |
| CN | 113011591 A | * | 6/2021 | G06N 10/40 |
| CN | 113515165 A | * | 10/2021 | G06F 1/022 |
| CN | 114528998 A | * | 5/2022 | G06E 3/001 |
| CN | 116050526 A | * | 5/2023 | G06N 10/00 |
| CN | 116523057 A | * | 8/2023 | G06N 10/00 |
| EP | 4515459 A1 | | 3/2025 | |
| NL | 2026015 B1 | * | 3/2022 | H04L 9/0855 |
| NL | 2029849 B1 | * | 6/2023 | H04J 3/1694 |
| WO | 2020/081805 A1 | | 4/2020 | |
| WO | WO-2021059013 A1 | * | 4/2021 | G06N 10/80 |
| WO | WO-2022123268 A2 | * | 6/2022 | G06N 10/00 |
| WO | WO-2022159847 A1 | * | 7/2022 | G06N 10/20 |
| WO | WO-2022169360 A1 | * | 8/2022 | G06F 1/12 |
| WO | WO-2022169671 A1 | * | 8/2022 | G06F 17/16 |
| WO | 2023/208815 A1 | | 11/2023 | |
| WO | 2023/209508 A1 | | 11/2023 | |

OTHER PUBLICATIONS

Andrés-Martínez, P. et al., "Automated Distribution of Quantum Circuits via Hypergraph Partitioning"; arXiv:1811.10972v5 [quant-ph] (2019); 12 pgs.

Dou, X. et al., "A New Qubits Mapping Mechanism for Multi-Programming Quantum Computing"; Proceedings of the ACM International Conference on Parallel Architectures and Compilation Techniques (2020); 12 pgs.

Niu, S. et al., "Enabling Multi-Programming Mechanism for Quantum Computing in the NISQ Era"; arXiv:2102.05321v1 [cs.AR] (202); 15 pgs.

Das, P. et al., "A Case for Multi-Programming Quantum Computers"; Association for Computing Machinery (2019); 13 pgs.

Corcoles, A. D. et al., "Exploiting Dynamic Quantum Circuits in a Quantum Algorithm with Superconducting Qubits"; arXiv:2102.01682v1 [quant-ph] (2021); 19 pgs.

Steffen, L. et al., "Realization of Deterministic Quantum Teleportation with Solid State Qubits"; arXiv:1302.5621v1 [quant-ph] (2013); 8 pgs.

Chou, K. S., "Deterministic Teleportation of a Quantum Gate Between Two Logical Qubits"; arXiv:1801.05283v1 [quant-ph] (2018); 33 pgs.

Ryan, C. A., et al., "Hardware for Dynamic Quantum Computing"; arXiv:1704.08314v1 [quant-ph (2017); 13 pgs.

Cross, A. et al., "OpenQASM 3: A Broader and Deeper Quantum Assembly Language", arXiv:2104, 14722v1 (2021), 54 pgs.

Parekh, R. et al., "Quantum Algorithms and Simulation for Parallel and Distributed Quantum Computing", arXiv:2106.06841.v1 (2021), 7 pgs.

International Search Report and Written Opinion issued Jul. 7, 2023 in related application No. PCT/IB2023/054033, 13 pgs.

Gebauer et al., "A Modular RFSoC-based Approach to Interface Superconducting Quantum Bits" 2021 International Conference on Field-Programmable Technology (ICFPT), 2021, 9 pages.

International Searching Authority, "Notification of Transmittal of the International Search Report and the Written Opinion of the International Searching Authority, or Declaration," Patent Cooperation Treaty Jun. 27, 2023, 11 pages, International Application No.-PCT/EP2023/060598.

* cited by examiner

CENTRAL CONTROLLER FOR A QUANTUM SYSTEM

BACKGROUND

Technical Field

The present disclosure generally relates to quantum computing.

Description of the Related Arts

Superconducting quantum computing is an implementation of a quantum computer in superconducting electronic circuits. Quantum computation studies the application of quantum phenomena for information processing and communication. Various models of quantum computation exist, and the most popular models include the concepts of qubits and quantum gates. A qubit is a generalization of a bit that has two possible states, but can be in a quantum superposition of both states. A quantum gate is a generalization of a logic gate, however the quantum gate describes the transformation that one or more qubits will experience after the gate is applied on them, given their initial state. Various quantum phenomena, such as superposition and entanglement, do not have analogs in the world of classical computing and therefore may involve special structures, techniques, and materials.

SUMMARY

Some embodiments of the disclosure provide a quantum computing system having a central controller with improved latency. The system executes a first instruction at a processing unit of the central controller. The central controller interconnects a plurality of control entities for configuring and measuring a plurality of qubits. A set of one or more selected channels carry measurement results for a first quantum computation by the plurality of qubits. When the first instruction is a multi-channel-receive instruction, the system stalls the processing unit from executing any further instructions until each channel of a set of selected channels has provided an input from a remote peer. Different channels in the set of selected channels are examined simultaneously. The inputs provided by the set of selected channels reside in a set of registers of the processing unit that can be queried.

The system resumes execution at the processing unit of a second instruction after the stalling. The second instruction may cause the central controller to send a message to trigger a second quantum computation by the plurality of qubits. A control entity in the plurality of control entities is synchronized with the central controller and is already waiting for the message to trigger a sequence of instructions for the second quantum computation. The second instruction may be a conditional instruction that operates based on the measurement result of the first quantum computation.

In some embodiments, the set of selected channels being examined is a configurable subset of a plurality of channels. A channel select register provides a plurality of bits corresponding to each channel of the plurality of channels, each bit indicating whether the corresponding channel is required for resuming execution at the processing unit. The data of the channel select register may be stored in one or more built-in registers of the processing unit.

In some embodiments, the system may resume execution by the processing unit after an occurrence of a timeout condition. The timeout condition may be based on a configurable timeout value that is set by an instruction of the processing unit. The occurrence of the timeout condition may be indicated by setting a bit in a condition register to allow a conditional jump to handle the timeout. The occurrence of the timeout condition may also be indicated by setting a bit in an error register that is polled by the processing unit.

In some embodiments, the multi-channel-receive instruction is implemented by a start-the-receive instruction and a wait-receive-or-timeout instruction. If the first instruction is a start-the-receive instruction, the system starts a set of one or more selected channels to receive data from remote peers, starts a timeout counter for the timeout condition, and proceeds to execute another instruction at the processing unit without stalling. If the first instruction is a wait-receive-or-timeout instruction, the system stalls the processing unit from executing any further instructions until each channel of the set of selected channels has provided an input from a remote peer or when the timeout counter indicates a timeout condition.

By using dedicated logic in a processing unit to implement a multi-channel receive instruction, the processing unit can avoid polling individual channels and instead quickly determine whether a particular event has occurred. When the processing unit is used as a central controller of a quantum computing system, the use of the multi-channel receive instruction improves latency and thus overall operational speed at the central controller so that the central controller can enable conditional quantum computing operations.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

When implementing a quantum computing system based on Transmon qubits (a type of superconducting qubit having reduced sensitivity to charge noise), it is common practice to have control entities outside of a cryostat. Such a control entity may have a processor, memory, analog digital converters for generating waveforms, initiating measurement, and detecting qubit states for a single qubit or a few qubits. A control entity that controls or drives the configuration of a qubit is referred to herein as a drive entity or a drive node. A control entity that controls the measurement and read-out of a qubit is referred to herein as a measuring entity or an acquire node.

Due to the limited lifetime of Transmon qubits, such drive and measuring entities are designed to have responsiveness or latency on a nanosecond scale. This is partly because a quantum logical gate may involve two (or more) qubits to be synchronously controlled by waveforms generated by two or more drive entities, and such waveforms must arrive at the two or more qubits at nearly the same time.

Figure 1:
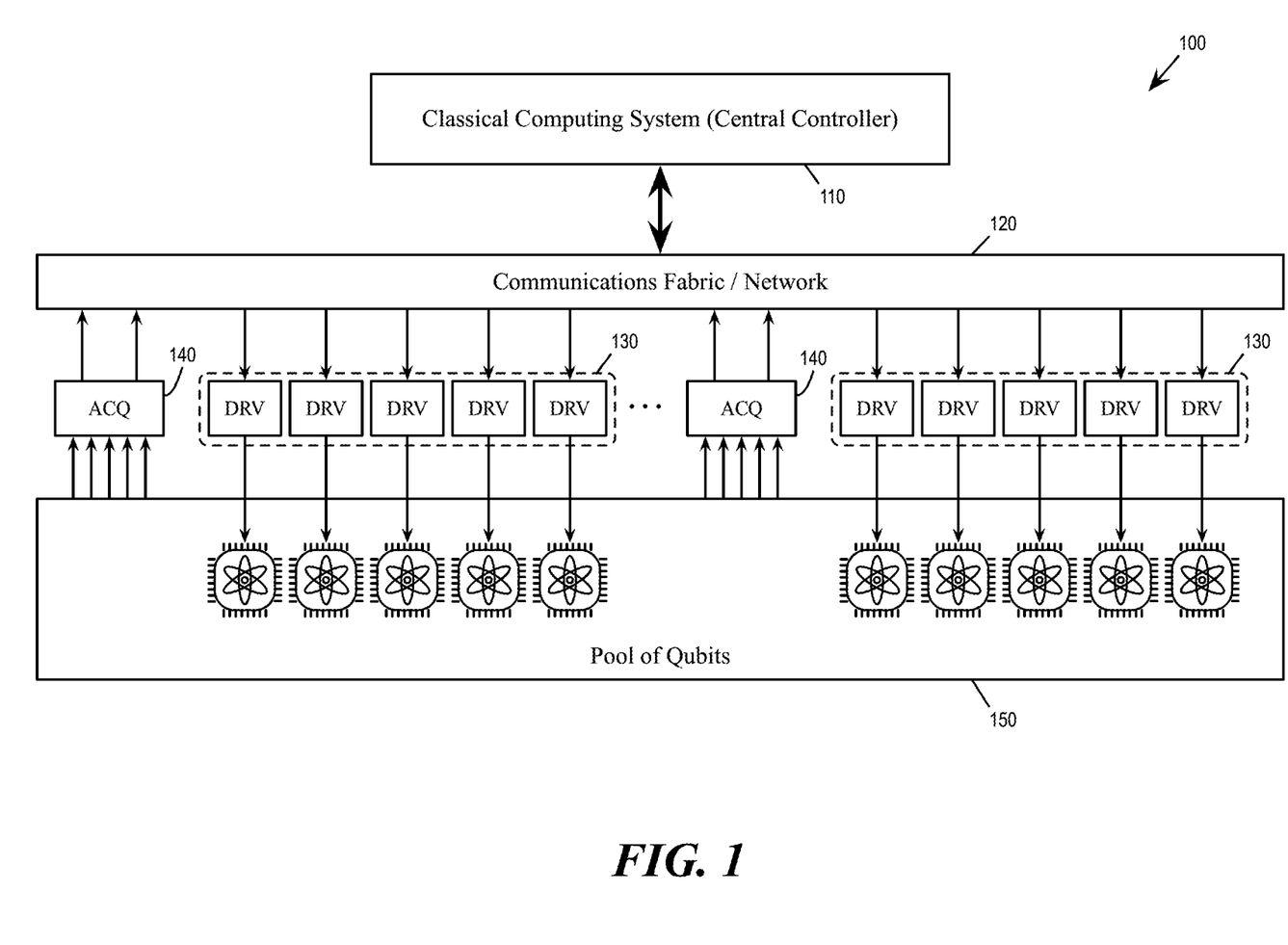
FIG. 1 conceptually illustrates a quantum computing system having a central controller that coordinates quantum computing operations across multiple control entities of qubits, consistent with an exemplary embodiment.

Having multiple control entities running a task in parallel on many qubits involves exchange of status information and intermediate results based on calculation in classical domain between the control entities. In some embodiments, a hub function is used to coordinate such communications through a low latency network. Such a hub function is undertaken by a central controller of the quantum computing system. The central controller conducts quantum computing across the many qubits by performing the calculations in the classical domain and coordinating the communication between the different control entities. FIG. 1 conceptually illustrates a quantum computing system having a central controller (or hub) that coordinates quantum computing operations across multiple control entities of qubits, consistent with an illustrative embodiment. The system includes a classical computing system 110, a communications fabric 120, drive nodes 130, acquire nodes 140, and a pool of qubits 150. To perform a computing task using the quantum computing system 100, the classical computing system 110 can configure the qubits 150 to perform specific quantum computing tasks.

The classical computing system 110 serves as central controller or the hub of the quantum computing system 100. The classical computing system 110 includes one or more computing engines or computing devices performing computing tasks in the classical domain. The computing engines of the classical computing system 110 may operate multiple threads or may have multiple cores that can run different algorithms or programs in parallel. The classical computing system 110 can manage overall program flow and determine the timing of computing tasks or actions. The classical computing system 110 may send information by broadcast to all drive nodes 130 or by multicast to different groupings or partitions of drive nodes. The classical computing system 110 can also make global decisions based on qubit values or measurements gathered by acquire nodes 140. The central controller or hub 110 can also include receive channels from the qubit measuring entities 140 and transmit channels for qubit drive entities 130.

The fabric 120 is a low latency network fabric for relaying messages or signals from the classical computing system 110 to the drive nodes 130 and from the acquire nodes 140 back to the classical computing system 110. The fabric may forward a packet to a specific destination based on an address, broadcast a packet to all destinations, or multicast a packet to a specific group of destinations based on a multicast identifier.

The drive nodes 130 (or driving entities) refer to control entities that drive individual qubits. The drive nodes 130 are also network endpoints that receive the messages or signals sent by the classical computing system 110. Each drive node is a computing device that may execute codes or run parts of an algorithm or program. Each drive node may also make local decisions based on qubit values or measurements. In some embodiments, each drive node controls exactly 1 qubit in the pool 150.

The acquire nodes 140 (or measuring entities) refer to control entities that perform measurements of qubits. Each acquire node may be a shared receiver that gathers measurements from multiple qubits. The acquire nodes 140 can also be network endpoints that relay the measurements back to the classical computing system 110. Each acquire node performs readout for multiple qubits. In some embodiments, the acquire node uses frequency multiplexing to accommodate read-out of multiple qubits. The frequency resolution determines how many qubits an ACQ card can readout.

The pool of qubits 150 includes an array or an arrangement of qubits that can be configured to perform quantum computing tasks. Individual qubits may be implemented by superconducting devices in a cryostat. Each qubit can be configured by one of the drive nodes 130 and can be measured by one of the acquire nodes 140.

The quantum computing system 100 supports quantum algorithms with conditional execution sequences that depend on intermediate results. During the execution of such quantum algorithms, a code-driven processing function on the central controller or hub 110 waits to receive status or measurement information from the qubit measuring entities 140 at given times after the algorithm start time. The hub 110 evaluates the received information and performs logical operations based on the received information. Based on the results of the logical operations, the hub 110 transmits a result information together with a time information to the control entities (driving entities 130 and measuring entities 140). The control entities then continue execution based on the transmitted result information at a time specified by the time information.

Figure 2:
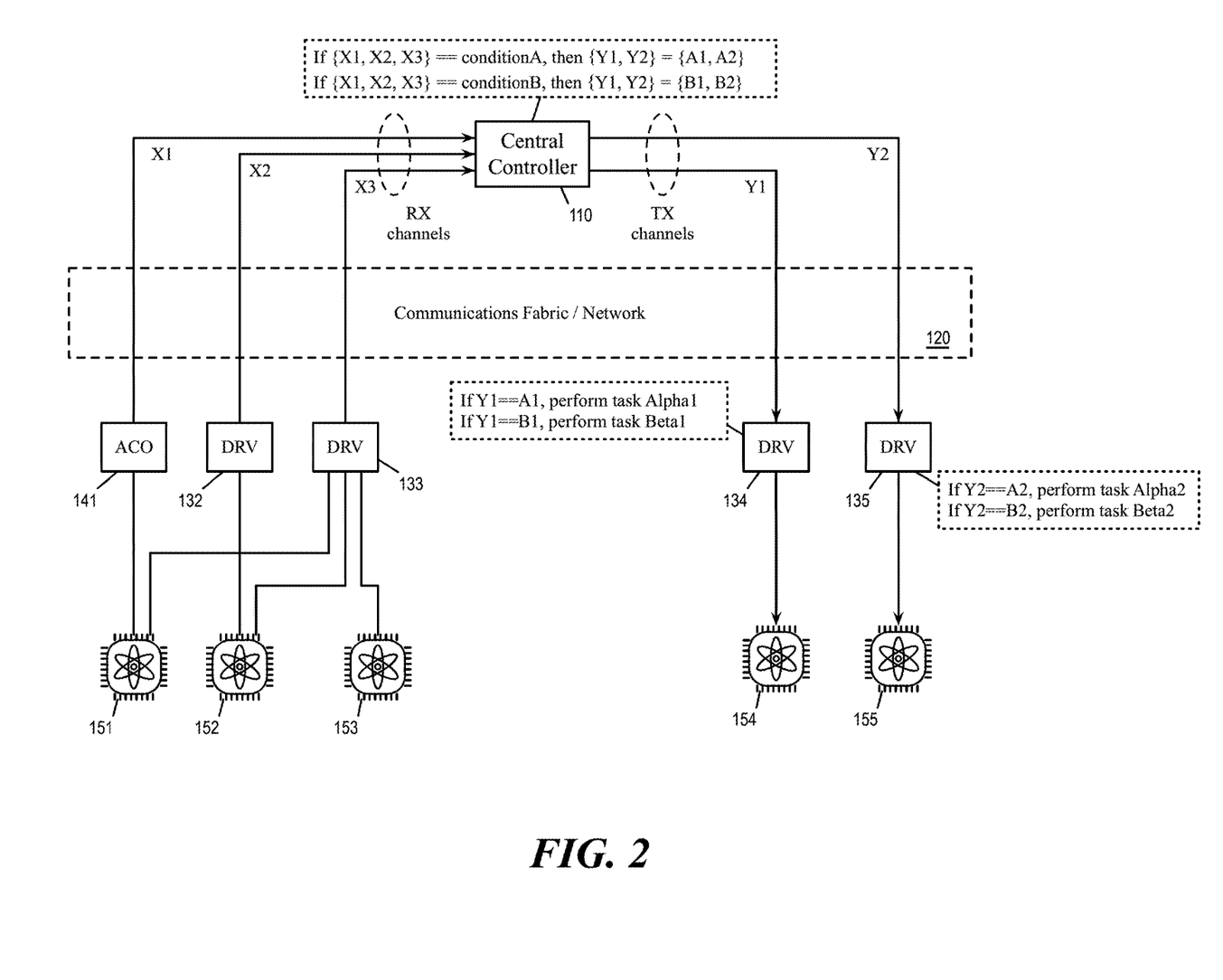
FIG. 2 conceptually illustrates the quantum computing system supporting conditional execution sequences that depend on intermediate quantum computation results.

FIG. 2 conceptually illustrates the quantum computing system 100 supporting conditional execution sequences that depend on intermediate quantum computation results. As illustrated, the central controller 110 receives status and/or measurement results from several control entities (acquire node 141, driving node 132, and driving node 133) through a set of receive channels {X1, X2, X3}. The received status and measurement results include that of qubits 151, 152, and 153. The central controller 110 also sends signals or messages through a set of transmit channels {Y1, Y2} to driving entities 134 and 135, which configure the qubits 154 and 155. The central controller 110 can execute conditional operations that determine the signals to be transmitted at transmit channels {Y1, Y2} based on the data received from channels {X1, X2, X3}. Thus, the quantum computation to take place at qubits 154 and 155 is conditional upon the measurement result of the quantum computation already taken place at qubits 151, 152, and 153. For clarity of illustration, the example of FIG. 2 shows the set of qubits being measured and the set of qubits performing the conditional operation as being distinct sets of qubits. However, the system supports conditional operations in which a qubit may perform a conditional operation based on measurement taken from itself, i.e., the set of qubits being measured and the set of qubits performing the conditional operations may be the same set of qubits.

As some measuring entities perform measurement and send the measurement results to the central controller 110, some control entities (e.g., driving entities and measuring entities) are configured by their code streams to be already waiting to execute the next instruction pending on the measurement result. As soon as the hub 110 completes its logical operations based on the measurement results, the hub may send messages to trigger the control entities (which may be in a wait mode) to proceed with driving and measuring the qubits. Each control entity is synchronized with the hub to be already waiting for the triggering message to proceed according to one of multiple preloaded code sequences. In the example of FIG. 2, the driving entities 134 and 135 are synchronized with the hub 110 and configured to execute one of the preloaded sequences as soon as the conditional evaluation is complete at the hub 110.

Common to all components of the system (control entities and the hub function) is a high precision clock distribution network or equivalent means which guarantees a synchronous clock base for all components. When executing a quantum algorithm, all components in the system 100 start at the same algorithm start time. In some embodiments, to synchronize all components in the system and to compensate for network delays, the information distributed by the hub may include a future action time offset. This offset is set to be large enough to compensate for any worst-case delays and timing variations. Upon receiving a future action time offset, a component waits until the time specified by the future action time offset is reached to execute the next instruction. This ensures all components to remain synchronized to the common system clock and guarantees continuous synchronous operation on all control entities of qubits.

In some embodiments, the central controller 110 has a local CPU that supports quantum specific instructions for low latency processing and messaging between the control entities and the hub. The messaging logic and the instruction execution logic of the local CPU of the hub are tightly coupled to the control entities but without the software overhead of polling status information of receive or transmit channels. The operations of the hub can therefore be in lockstep with the operations of the control entities. This architecture can scale to larger number of qubits without change to the system topology. In some embodiments, the local CPU is real-time capable, i.e., does not perform speculative execution, prefetching, or deep pipelining. Operations such as speculative execution, prefetching, or deep pipelining cause significant fluctuations in execution time, which in turn disturb the synchronization among the control entities of the qubits in the pool 150. The control entities such as the drive nodes 130 and the acquire nodes 140 are synchronized to work in tandem to carry out quantum computations and/or measurements.

Figure 3:
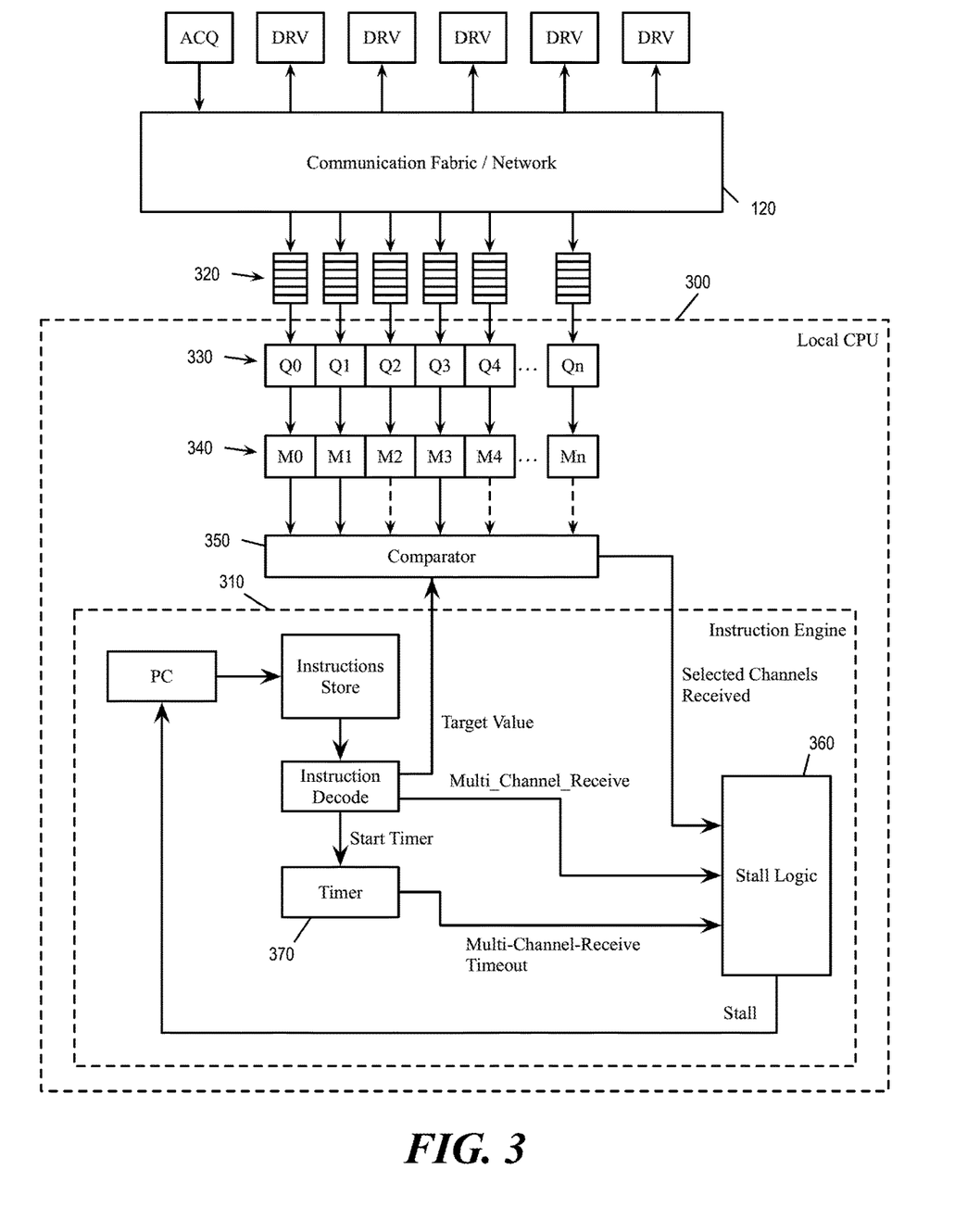
FIG. 3 conceptually illustrates a quantum computing hub having a local CPU that supports low latency processing and messaging.

FIG. 3 conceptually illustrates a quantum computing hub 110 having a local CPU 300 that supports low latency processing and messaging. The local CPU 300 supports instructions that are customized for quantum computing by enabling low latency messaging between the quantum computing hub 110 and the control entities of the qubits.

As illustrated, the hub 110 of the quantum computing system 100 includes receive and transmit buffers 320 for messaging with control entities of qubits (driving and measuring) at numerous different channels. The buffers 320 are connected to the low latency network 120 on one end and to a status and message register 330 on the other. The status and message register 330 is directly coupled by logic functions to the instruction engine 310 of the local CPU 300. The status and message register 330 include members or bits Q0-Qn that correspond to the different messaging channels. In some embodiments, each channel of the status and message register 330 includes an indication of whether an event has occurred or valid data (e.g., qubit measurement) has arrived at the channel from a remote peer in addition to the data itself.

The local CPU 300 of the hub 110 has an extension for quantum specific instructions in addition to an existing standard instruction set, and the local CPU 300 has dedicated logic circuits to implement the quantum specific extension. For example, in some embodiments, a dedicated logic stalls the instruction engine 310 during execution of a quantum instruction until certain conditions are fulfilled. Examples of these conditions may include having already received all of a configurable subset of the receive channels, having already waited more than a specific amount of time, etc.

FIG. 3 illustrates example dedicated logic (e.g., hardware circuits) for a quantum specific instruction. As illustrated, the local CPU 300 includes a masking register 340, whose individual bits M0-Mn correspond to the member channels Q0-Qn of the status and message register 330. The masking register 340 is also referred to as channel select register, since it is used to select a subset of the channels in the status and message register 330 while excluding others. The selected subset of the channels that are not masked by the masking register 340 are permitted to reach a comparator 350. In the example, the channels Q0, Q1, and Q3 are selected by the channel selected register 340 to reach the comparator 350.

The comparator 350 is a set of dedicated logic gates or circuits that are configured to determine whether each of the selected channels has an event. (In some embodiments, the actual values that are received on that channel are not considered by the comparator.) In one embodiment, the channel select register 340 and/or the comparator 350 may be configured by a currently executed instruction or a previously executed instruction. The dedicated logic of the comparator 350 allows all of the selected channels to be examined simultaneously and by only one instruction. The comparator may complete an operation within a predetermined time (e.g., one CPU clock cycle, 1 millisecond, etc.) and it can continuously examine new data incoming from the buffers 320 even if the instruction engine 310 is stalled.

In some embodiments, the logic circuits of the masking register 340 and the comparator 350 are used to implement a "multi-channel-receive" (sometimes also called a "receive-under-mask", or "recqm") instruction that is specific to quantum computing. This quantum instruction can cause the instruction engine 310 of the CPU 300 to stall until all selected channels have provided inputs from their respective remote peers (e.g., control entities of qubits). As illustrated, the instruction engine 310 has a stall logic 360. The stall logic 360 causes the program counter (PC) to stop advancing when the following conditions are met: (1) the current instruction is "multi-channel-receive" instruction; (2) not all selected channels have provided input from remote peers; and (3) a timeout condition for the "multi-channel-receive" instruction has not occurred.

During the stall, the buffers 320 continue to operate to receive data from the control entities of qubits, and the comparator 350 continues to examine all selected channels. The CPU will resume execution as soon as all selected channels have provided input from remote peers. In the example of FIG. 3, the stalling of the CPU will end as soon as channels Q0, Q1, and Q3 have all received valid input from their respect control entities.

The CPU may also resume execution if a timeout condition has occurred, regardless of whether all selected channels have provided input. The timeout ensures that the CPU will not stall indefinitely. When the "multi-channel-receive" timeout occurs (when a timer 370 reaches terminal count), the stall logic 360 will lift the stall condition and let the PC advance to resume CPU execution. The timer 370 may be configured with a timeout value by an earlier instruction. The occurrence of the timeout condition may be indicated by setting a bit in a condition register to allow a conditional jump to handle the timeout, e.g., by an interrupt service routine.

The content of the status and message registers 330 can be accessed by the central controller by e.g., polling. However, an instruction such as the "recqm" instruction eliminates the need for the central controller 110 to repeatedly poll individual status and message registers 330 of the different control entities of qubits. This quantum specific instruction can minimize the latency between the end of a first quantum computation and the start of a second quantum computation that is conditional upon the result of the first quantum computation.

In some embodiments, the function of the "recqm" instruction (multi-channel-receive) can be implemented by two separate instructions: a "startqm" instruction and a "waitqm" instruction. The "startqm" (start-the-receive) instruction starts the reception process for data from selected qubits (through channels selected by the masking register 340). (The reception process is started when the bits in the status and message registers 330 is reset to indicate "no event occurred".) The "startqm" instruction also starts the timeout counter. The "startqm" instruction does not stall the processor, i.e., the processor continues with the next instruction right after starting-the-receive instruction but does not wait for data from the selected qubits to arrive.

The "waitqm" (wait-receive-or-timeout) instruction stalls the processor and waits for (i) data from all selected qubits to arrive or (ii) the timeout, without starting the reception process (e.g., without resetting the status and message registers 330). This allows the processor to perform useful calculations while the events drop in instead of just waiting. In some embodiments, instead of the "waitqm" instruction, a "done" bit is used to indicating that all qubits have arrived, so that the programmer can implement a polling solution, or a mix of polling and using the "waitqm" instruction.

Figure 4A:
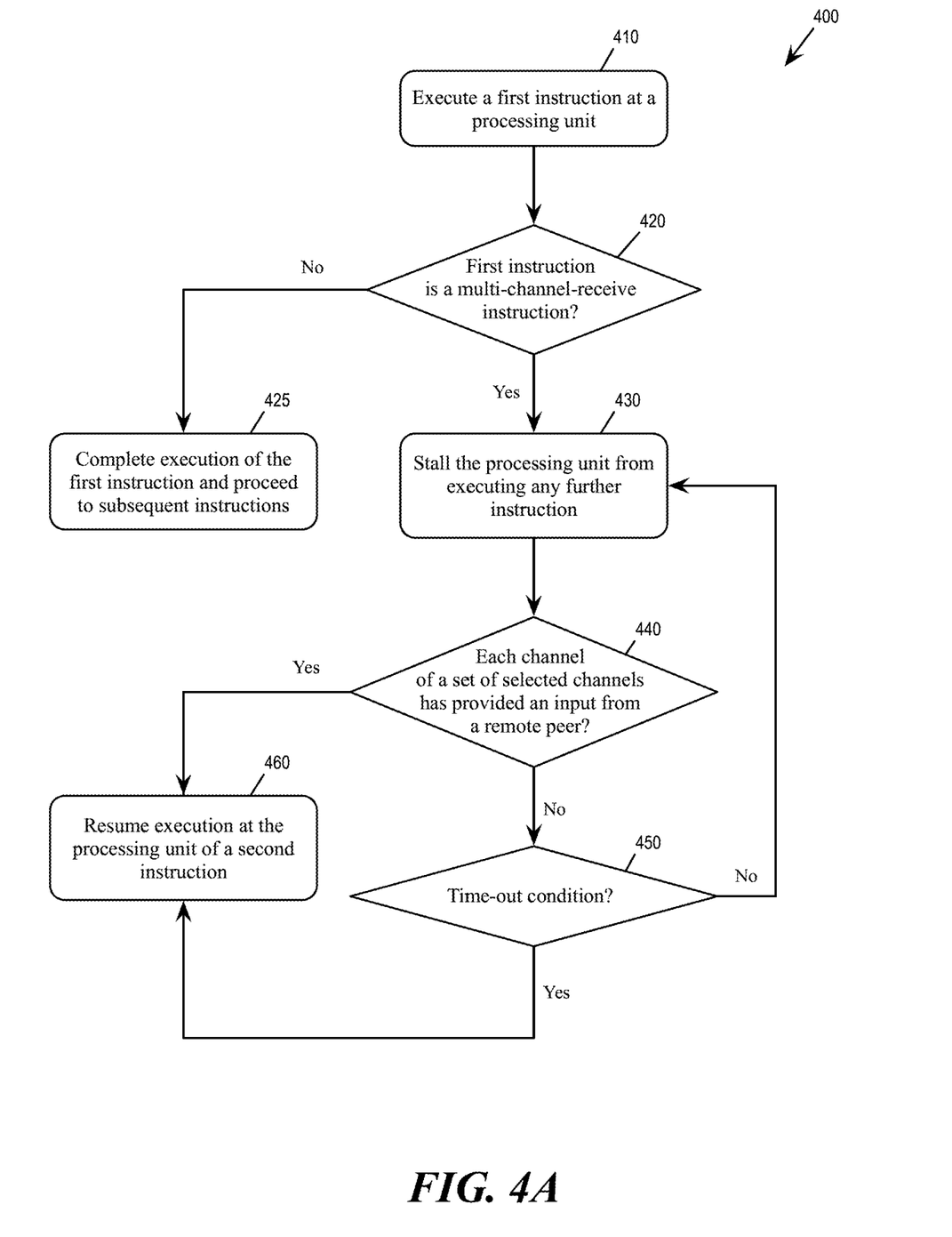
FIGS. 4A-B conceptually illustrates a process performed by a central controller of a quantum computing system, consistent with an illustrative embodiment.
Figure 4B:
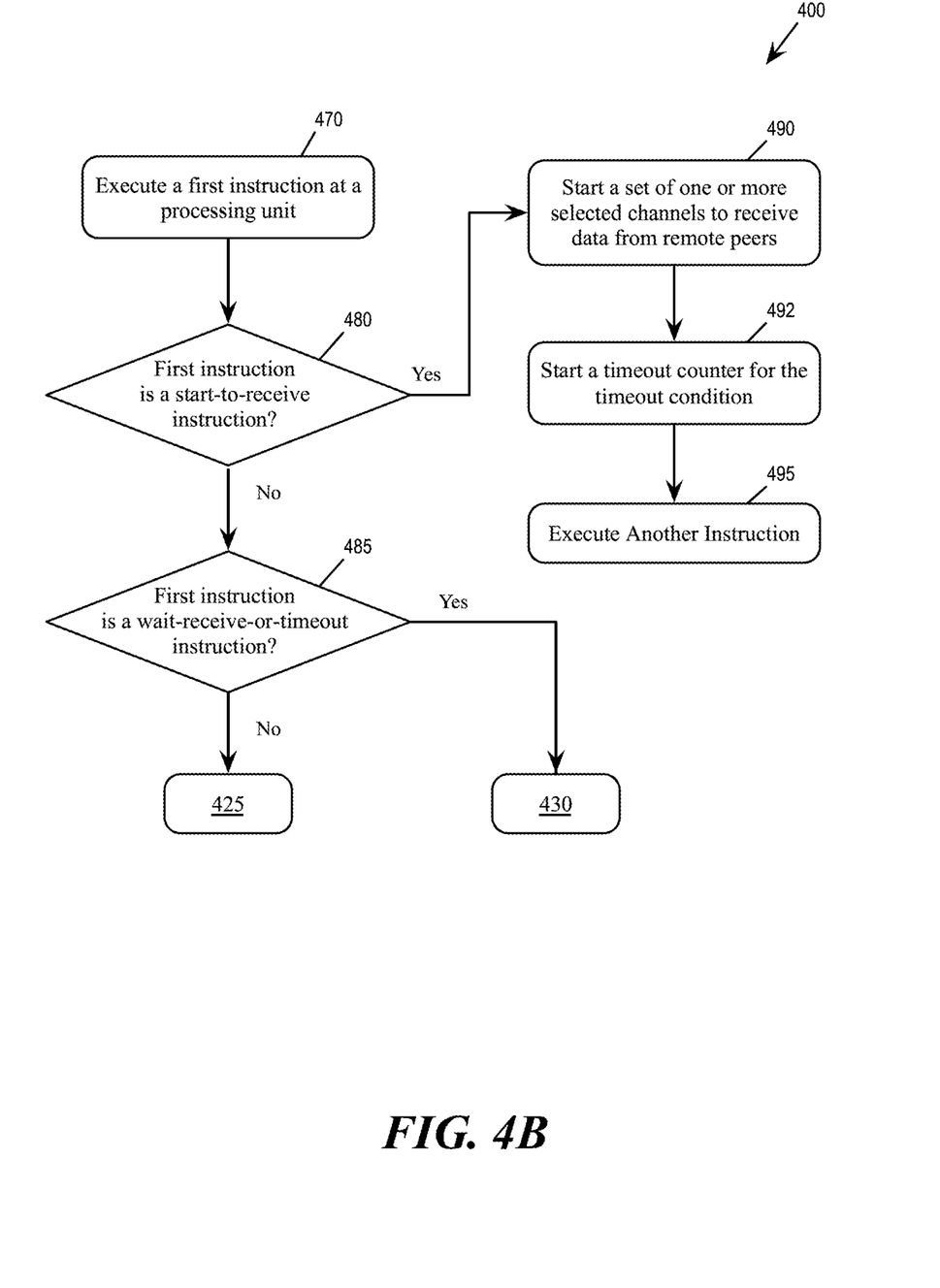

FIGS. 4A-B conceptually illustrates a process 400 performed by a central controller of a quantum computing system, consistent with an illustrative embodiment. In some embodiments, one or more processing units (e.g., processor) of a computing device implementing the hub 110 of the quantum computing system 100 perform the process 400 by executing instructions stored in a computer readable medium. The hub interconnects a pool of multiple control entities for configuring and measuring a pool of multiple qubits. The hub transmits messages to the pool of control entities through a network. In some embodiments, the one or more processing units performing the process 400 is the CPU 300, which has dedicated logic for low latency quantum-specific instructions.

The system executes (at block 410) a first instruction at the processing unit. The system determines (at block 420) whether the first instruction is a multi-channel-receive instruction. If so, the process proceeds to 430. Otherwise, the system completes (at block 425) the first instruction and proceed to subsequent instructions.

The system stalls (at block 430) the processing unit from executing any further instructions. The system determines (at block 440) whether each channel of a set of one or more selected channels has provided an input from a remote peer. Each channel of the set of channels carries a measurement result for a first quantum computation by a pool of qubits from a control entity. In some embodiments, the inputs provided by the set of selected channels reside in a set of registers of the processing unit that can be queried. In some embodiments, the set of selected channels is a configurable subset of an array of channels that are selected by a channel select register, which provides bits that correspond to the channels in the array of channels. Each bit indicates whether the corresponding channel is required for resuming execution at the processing unit. In some embodiments, the data of the channel select register is stored in one or more built-in registers of the processing unit. In some embodiments, the different channels in the set of selected channels are examined simultaneously and continuously by a dedicated logic circuit. If each channel of the set of selected channels has provided an input from a remote peer, the process proceeds to 460. Otherwise, the process proceeds to 450.

The system determines (at 450) whether a timeout condition has occurred. The timeout condition may be based on a configurable timeout value that is set by an instruction of the processing unit, either as an immediate value or as an indirect pointer to a processor register. In some embodiments, the occurrence of the timeout condition is indicated by setting a bit in a condition register to allow a conditional jump (e.g., to an interrupt service routine) to handle the timeout. In some embodiments, the occurrence of the timeout condition is indicated by setting a bit in an error register that is polled by the processing unit. If the time out condition has occurred, the process proceeds to 460 to resume execution, regardless of whether each selected channel has provided an input from a remote peer. Otherwise, the process returns to 430 to continue stalling the processing unit.

The system resumes (at 460) execution at the processing unit of a second instruction. The second instruction may be one that causes the central controller to send a message to trigger a second quantum computation by the pool of multiple qubits. The second instruction may also be a conditional instruction that operates based on the measurement result of the first quantum computation. In some embodiments, each control entity is synchronized with the central controller so the control entity is already waiting for the message to trigger a sequence of instructions for the second quantum computation. The second instruction may also be the beginning of an error or interrupt service routine that is entered into, due to the timeout condition.

As mentioned, in some embodiments, the multi-channel-receive instruction is implemented by a "startqm" (start-thereceive) instruction and a "waitqm" (wait-receive-or-timeout) instruction. In some of these embodiments, the system executes (at block 470) a first instruction at the processing unit. The system determines (at block 480) whether the first instruction is a start-the-receive instruction. If so, the process proceeds to 490. Otherwise, the process proceeds to 485.

At block 485, the system determines whether the first instruction is a wait-receive-or-timeout instruction. If so, the process proceeds to block 430 to stall the processing unit from executing any further instructions until each channel of the set of selected channels has provided an input from a remote peer or when the timeout counter indicates a timeout condition. Otherwise, the process proceeds to block 425 to complete the first instruction and proceed to subsequent instructions.

At block 490, the system starts a set of one or more selected channels to receive data from remote peers. In some embodiments, this is done by resetting bits in the message and status registers 330 to indicate that no event has occurred among the selected channels. The process also starts (at 492) a timeout counter for the timeout condition. The process then proceeds (at 495) to execute another instruction at the processing unit without stalling.

By using dedicated logic in a processing unit to implement a multi-channel receive instruction, the processing unit can avoid polling individual channels and instead quickly determine whether a particular event has occurred. When the processing unit is used as a central controller of a quantum computing system, the use of the multi-channel receive instruction improves latency at the central controller so that the central controller can enable conditional quantum computing operations.

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIG. 4) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
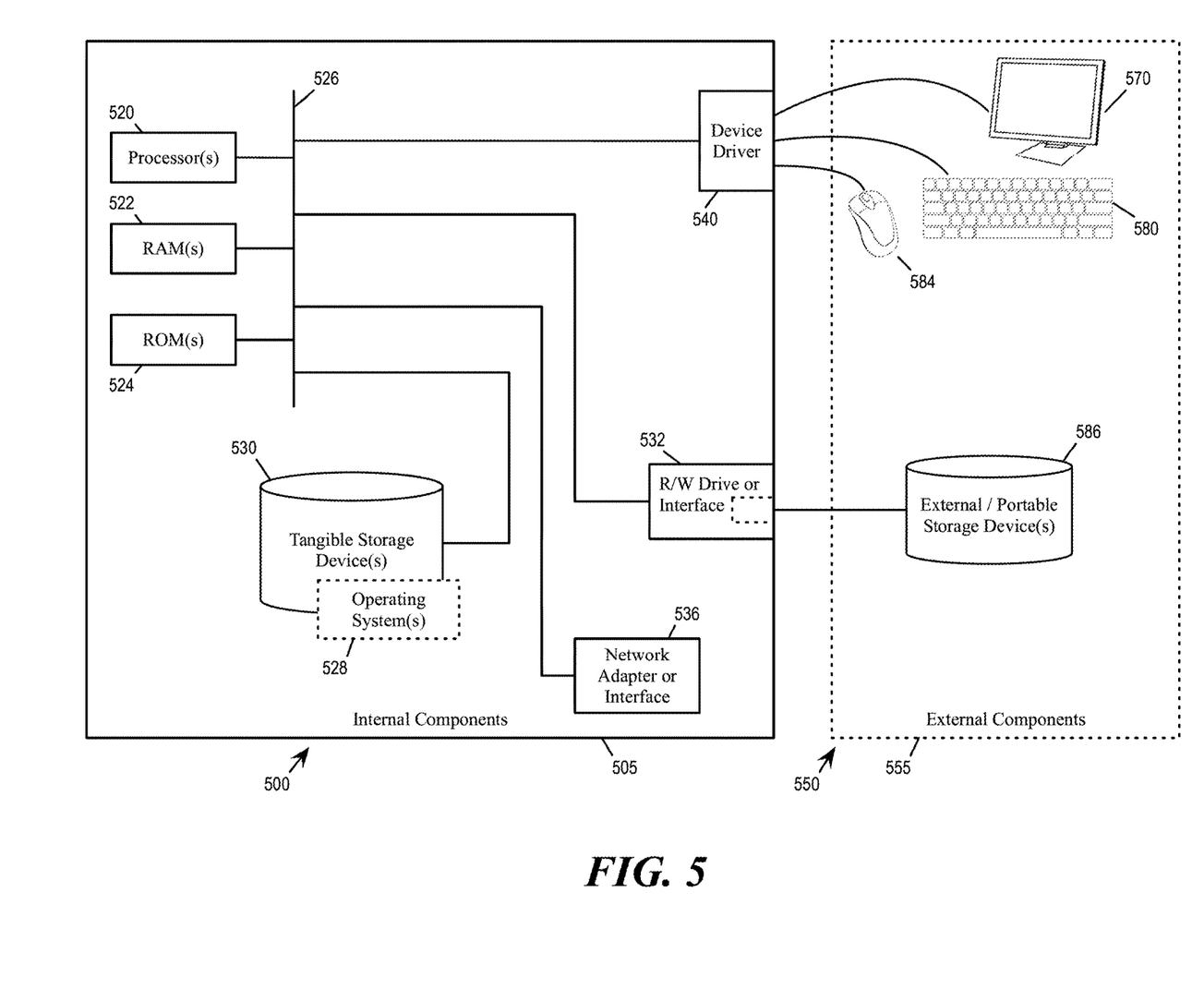
FIG. 5 shows a block diagram of the components of a data processing system in accordance with an illustrative embodiment of the present disclosure.

FIG. 5 shows a block diagram of the components of data processing systems 500 and 550 that may be used to implement the central controller (e.g., the classical computing system 110) of a quantum computing system in accordance with an illustrative embodiment of the present disclosure. It should be appreciated that FIG. 5 provides only an illustration of one implementation and does not imply any limitations with regard to the environments in which different embodiments may be implemented. Many modifications to the depicted environments may be made based on design and implementation requirements.

Data processing systems 500 and 550 are representative of any electronic device capable of executing machine-readable program instructions. Data processing systems 500 and 550 may be representative of a smart phone, a computer system, PDA, or other electronic devices. Examples of computing systems, environments, and/or configurations that may represented by data processing systems 500 and 550 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 500 and 550 may include a set of internal components 505 and a set of external components 555 illustrated in FIG. 5. The set of internal components 505 includes one or more processors 520, one or more computer-readable RAMs 522 and one or more computer-readable ROMs 524 on one or more buses 526, and one or more operating systems 528 and one or more computer-readable tangible storage devices 530. The one or more operating systems 528 and programs such as the programs for executing the process 400 are stored on one or more computer-readable tangible storage devices 530 for execution by one or more processors 520 via one or more RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

The set of internal components 505 also includes a R/W drive or interface 532 to read from and write to one or more portable computer-readable tangible storage devices 586 such as a CD-ROM, DVD, memory stick, magnetic tape, magnetic disk, optical disk or semiconductor storage device. The instructions for executing the process 400 can be stored on one or more of the respective portable computer-readable tangible storage devices 586, read via the respective R/W drive or interface 532 and loaded into the respective hard drive 530.

The set of internal components 505 may also include network adapters (or switch port cards) or interfaces 536 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 536. From the network adapters (or switch port adaptors) or interfaces 536, the instructions and data of the described programs or processes are loaded into the respective hard drive 530. The network may comprise copper wires, optical fibers, wireless transmission, routers, firewalls, switches, gateway computers and/or edge servers.

The set of external components 555 can include a computer display monitor 570, a keyboard 580, and a computer mouse 584. The set of external components 555 can also include touch screens, virtual keyboards, touch pads, pointing devices, and other human interface devices. The set of internal components 505 also includes device drivers 540 to interface to computer display monitor 570, keyboard 580 and computer mouse 584. The device drivers 540, R/W drive or interface 532 and network adapter or interface 536 comprise hardware and software (stored in storage device 530 and/or ROM 524).

The foregoing one or more embodiments implement a central controller of a quantum computing system that implements low latency instructions for quantum computing operations. The processing unit of the central controller has a dedicated logic for determining whether a set of selected channels has received data from control entities of qubits in the quantum computing system. The processing unit stalls until the dedicated logic determines that the set of selected channels has received the requisite data.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. Although the terms first, second, third, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
executing a first instruction at a processing unit of a first computing device, wherein the processing unit implements a central controller that interconnects a plurality of drive nodes and measuring entities for respectively configuring and measuring a plurality of transmon qubits in a superconducting quantum computing system, wherein respective drive nodes are separate computing devices, and a measuring entity is a separate device to measure and readout multiple transmon qubits; and
upon determining that the first instruction is a multi-channel-receive instruction:
stalling the processing unit from executing any further instructions until each channel of a set of selected channels has provided an input from a remote peer measuring entity, wherein different channels in the set of selected channels are examined simultaneously; and
resuming execution at the processing unit of a second instruction after the stalling;
wherein each channel of the set of selected channels carries a measurement result for a first quantum computation by the plurality of transmon qubits from the measuring entity;
wherein executing the second instruction causes the central controller to send a message, via the respective drive nodes, to trigger a second quantum computation by the plurality of transmon qubits;
wherein each drive node and measuring entity in the plurality of control entities is synchronized with the central controller; and
wherein the second instruction is a conditional instruction that operates based on the measurement result of the first quantum computation.

2. The computer-implemented method of claim 1, wherein the set of selected channels being examined is a configurable subset of a plurality of channels.

3. The computer-implemented method of claim 2, wherein a channel select register provides a plurality of bits corresponding to each channel of the plurality of channels, each bit indicating whether the corresponding channel is required for resuming execution at the processing unit.

4. The computer-implemented method of claim 1, wherein data of the channel select register is stored in one or more built-in registers of the processing unit.

5. The computer-implemented method of claim 1, further comprising resuming execution by the processing unit after an occurrence of a timeout condition regardless of whether each channel of the set of selected channels has provided an input from a remote peer.

6. The computer-implemented method of claim 5, wherein the timeout condition is based on a configurable timeout value that is set by an instruction of the processing unit.

7. The computer-implemented method of claim 6, wherein the occurrence of the timeout condition is indicated by setting a bit in a condition register to allow a conditional jump to handle the timeout.

8. The computer-implemented method of claim 6, wherein the occurrence of the timeout condition is indicated by setting a bit in an error register that is polled by the processing unit.

9. The computer-implemented method of claim 1, wherein the inputs provided by the set of selected channels reside in a set of registers of the processing unit that can be queried.

10. A computing device comprising:
a processing unit; and
a storage device storing a set of instructions, wherein an execution of the set of instructions by the processor configures the computing device to perform acts comprising:
executing a first instruction at a processing unit of a first computing device, wherein the processing unit implements a central controller that interconnects a plurality of drive nodes and measuring entities for respectively configuring and measuring a plurality of transmon qubits in a superconducting quantum computing system, wherein respective drive nodes are separate computing devices, and a measuring entity is a separate device to measure and readout multiple transmon qubits;
upon determining that the first instruction is a multi-channel-receive instruction:
stalling the processing unit from executing any further instructions until each channel of a set of selected channels has provided an input from a remote peer measuring entity, wherein different channels in the set of selected channels are examined simultaneously; and
resuming execution at the processing unit of a second instruction after the stalling; wherein each channel of the set of selected channels carries a measurement result for a first quantum computation by the plurality of transmon qubits from the measuring entity; wherein executing the second instruction causes the central controller to send a message, via the respective drive nodes, to trigger a second quantum computation by the plurality of transmon qubits; wherein each drive node and measuring entity in the plurality of control entities is synchronized with the central controller; and wherein the second instruction is a conditional instruction that operates based on the measurement result of the first quantum computation.

11. A computer-implemented method comprising:
executing a first instruction at a processing unit of a first computing device, wherein the processing unit implements a central controller that interconnects a plurality of drive nodes and measuring entities for respectively configuring and measuring a plurality of transmon qubits in a superconducting quantum computing system, wherein respective drive nodes are separate computing devices, and a measuring entity is a separate device to measure and readout multiple transmon qubits;
upon determining that the first instruction is a start-to-receive instruction:
starting a set of selected channels to receive data from remote peers;
starting a timeout counter; and
proceeding to execute another instruction at the processing unit without stalling; and
upon determining that the first instruction is a wait-receive-or-timeout instruction:
stalling the processing unit from executing any further instructions until each channel of the set of selected channels has provided an input from a remote peer measuring entity or when the timeout counter indicates a timeout condition, wherein different channels in the set of selected channels are examined simultaneously; and resuming execution at the processing unit of a second instruction after the stalling; wherein each channel of the set of selected channels carries a measurement result for a first quantum computation by the plurality of transmon qubits from the measuring entity; wherein executing the second instruction causes the central controller to send a message, via the respective drive nodes, to trigger a second quantum computation by the plurality of transmon qubits; wherein each drive node and measuring entity in the plurality of control entities is synchronized with the central controller; and wherein the second instruction is a conditional instruction that operates based on the measurement result of the first quantum computation.

* * * * *